July 16, 1963   D. J. LEECH ETAL   3,097,508
AIR CONDITIONING

Filed Dec. 22, 1960   3 Sheets-Sheet 1

July 16, 1963

D. J. LEECH ETAL 3,097,508

AIR CONDITIONING

Filed Dec. 22, 1960

United States Patent Office 3,097,508
Patented July 16, 1963

3,097,508
AIR CONDITIONING
Donald J. Leech, Melbury Osmond, Dorchester, and Brian H. Rogers, Yeovil, England, assignors to Normalair Limited, Yeovil, England
Filed Dec. 22, 1960, Ser. No. 77,599
Claims priority, application Great Britain Jan. 7, 1960
10 Claims. (Cl. 62—402)

This invention relates to aircraft air conditioning and more particularly to improved means for cooling an aircraft cabin and equipment bay for use although not exclusively in supersonic aircraft.

On existing aircraft, various forms of open circuit techniques have been used for air conditioning. A common form of open circuit technique comprises means for bleeding air from one or more suitable stages of an engine compressor, or the like, and further compressing it with the compressor of the air conditioning unit, cooling it in a heat exchanger and then allowing it to expand across a turbine of the air conditioning unit to a temperature and pressure suitable for circulating throughout the system. The air, in expanding across the turbine, develops sufficient power to drive the compressor. Thus the unit comprising compressor and turbine, mechanically connected, is completely self sustaining and is often referred to as a "bootstrap" unit. It is usual in systems of this type to use ram-air for cooling the engine bleed air before entry into the "bootstrap" unit.

With aircraft flying at supersonic speeds, for example Mach 2, any air conditioning or like system which uses ram air during some stage of its operation is undesirable because the ram air and associated ducting result in substantial parasitic drag. Further, it is known that systems which are based on the open circuit technique are particularly sensitive to rapid altitude change by the aircraft, and difficulty is experienced in preventing undesirably quick changes in cabin pressure conditions if the aircraft makes a rapid descent.

Substantially closed circuit means for air conditioning aircraft have been proposed wherein the same air is continually cooled and recirculated, a small amount of make-up air being added to maintain pressure and substantially condition the air. It has been realised that the true "bootstrap" unit as hereinbefore described cannot be used unassisted because the pressure of the air returning to the compressor stage of said unit is substantially the same as that which is required at exit from the turbine stage, and, therefore, the unit cannot run without energy being supplied to the system. Further, it has been found that the pressure ratio necessary to raise the temperature of the returning air to a value where heat can conveniently be extracted from it must be of the order of 5:1. Pressure ratios of this magnitude are not easily attainable with rotary compressors unless two, or more, stages are used.

It has therefore been proposed to provide a substantially closed circuit wherein the compressor is of a multistage type and the requisite energy input is obtained from another turbine, or like means, mechanically coupled to said compressor and turbine unit.

It will be realised by those skilled in the art that there are numerous disadvantages in such a system apart from its complexity. For example, the unit differs substantially from the tried and proven "bootstrap" unit and therefore requires considerable development work. Further, because the various components are directly coupled together and are thus constrained to run at some speed regardless of their own requirement it is difficult to obtain satisfactory efficiency under all operating conditions. Another difficulty is in balancing the axial thrust loads of such a unit.

It is with the above problems in mind that the following invention has been evolved which has for its object to provide means for air conditioning a substantially closed circuit passing through an aircraft cabin and equipment bays wherein the tried and proven "bootstrap" unit forms part of the system.

It is a further object of this invention to provide means for air conditioning a substantially closed circuit as in the preceding paragraph wherein the additional power required to operate the system is supplied directly to the circulating air by way of a turbo-driven compressor, said turbo-driven compressor being powered by compressed air bleed from an engine compressor.

It is a further object of this invention to provide means for air conditioning a substantially closed circuit as in the two preceding paragraphs wherein the necessary make-up air to maintain pressure is taken from the engine bleed air.

It is a still further object of this invention to provide means for air conditioning a substantially closed circuit, as in the three preceding paragraphs, wherein means are provided for varying the amount of heat extracted from the air to suit varying demands of the cabin and equipment bays.

The invention therefore consists in an aircraft, air conditioning apparatus for an enclosure having a substantially closed circuit air cooling system characterised by a "bootstrap" unit operated in combination with a compressor driven by a turbine of an auxiliary air circulating system, and having associated therewith air augmenting means, means for controlling the temperature therein and means for removing excess water.

The invention also consists in air conditioning apparatus for an enclosure according to the preceding paragraph wherein said cooling system comprises means for compressing the circulating air, cooling it and then causing it to expand across the "bootstrap" turbine to a lower pressure and temperature.

The invention also consists in an air conditioning apparatus for an enclosure as in the preceding two paragraphs, wherein "bootstrap" unit is operated in combination with said compressor driven by said turbine of said air circulating system in a manner that air is compressed by first and second stages, said first stage by means of the turbo-driven compressor and said second stage by means of said "bootstrap" compressor.

The invention also consists in an air conditioning apparatus for an enclosure as in the third preceding paragraph, wherein said auxiliary air circulating system comprises means for bleeding air from a compressor of an engine, or the like, at a suitable condition, causing it to expand across said auxiliary turbine, thus developing sufficient power to drive said turbo-driven compressor to which it is mechanically connected, said air being vented to atmosphere after circulating throughout the system.

The invention also consists in air conditioning apparatus for an enclosure as in the preceding four paragraphs wherein said auxiliary air circulating system has a regenerative cooler interposed between the source of said bleed air and said auxiliary turbine, the coolant for said regenerative cooler being said bleed air before it is vented to atmosphere.

The invention also consists in air conditioning apparatus for an enclosure as in the preceding five paragraphs wherein said cooling means between said compression stages and said "bootstrap" turbine comprises a fuel/air cooler in which the aircraft fuel in passing from the fuel tanks to the engines acts as the coolant.

The invention also consists in air conditioning apparatus for an enclosure as in the sixth preceding paragraph wherein said air augmenting means comprises suitable ducting and valves from the auxiliary air circuit, downstream of said regenerative cooler, to the closed circuit system upstream of said compression stages.

The invention also consists in air conditioning apparatus for an enclosure as in the seventh preceding paragraph wherein said means for controlling the temperature of the enclosure comprises a throttle valve between the bleed air source and the turbine, suitable ducting and valves from said auxiliary air circulating system upstream of said regenerative cooler, to the closed circuit air upstream of said enclosure and means for by-passing portions of said enclosure if desired.

The invention also consists in air conditioning apparatus for an enclosure as in the eighth preceding paragraph wherein the substantially closed circuit air to be conditioned is first compressed by the "bootstrap" compressor and secondly by the turbo-driven compressor.

The invention also consists in air conditioning apparatus as for an enclosure according to the second preceding paragraph wherein the substantially closed circuit air to be conditioned is first compressed by the turbo-drivene compressor and secondly by the "bootstrap" compressor.

The invention also consists in an air conditioning apparatus for an enclosure according to the ten preceding paragraphs wherein an intercooler is interposed in the substantially closed circuit between the two compression stages, the coolant being the air in said auxiliary air circuit disposed downstream of said auxiliary turbine and upstream of said regenerative cooler.

The invention also consists in air conditioning apparatus for an enclosure according to the preceding eleven paragraphs wherein said enclosure comprises an aircraft cabin and, or, equipment bays.

Further objects and advantages of the invention will become apparent from the following detailed description with reference to the drawings accompanying the specification.

Referring to the accompanying drawings.

Figure 1:
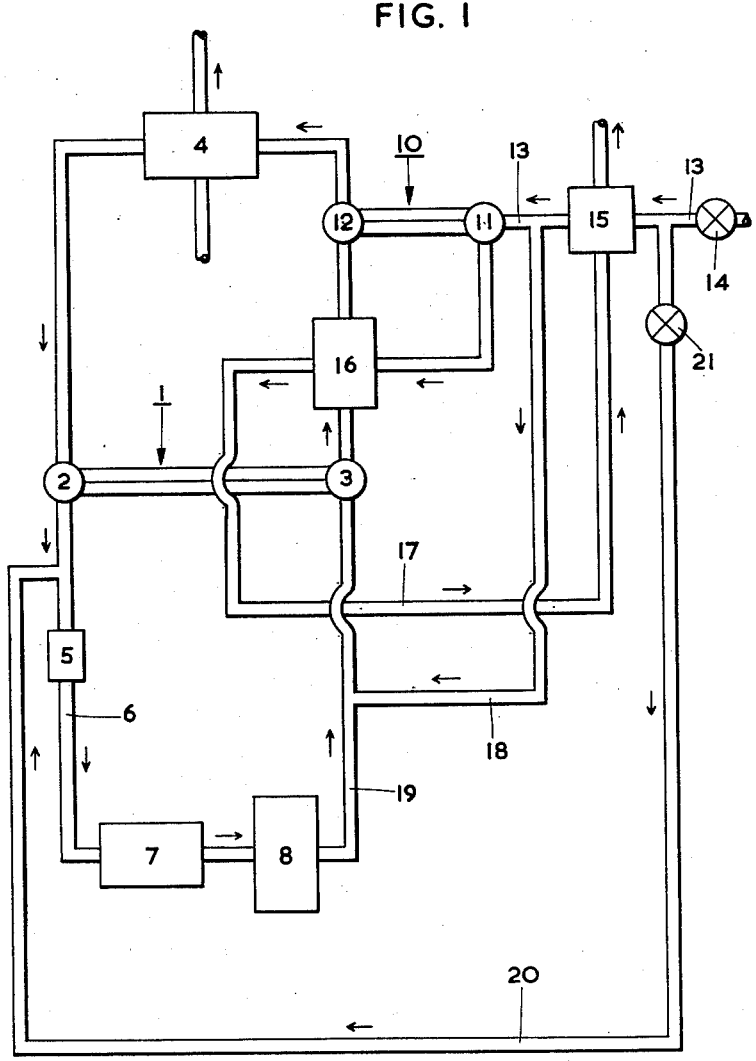
FIGURE 1 shows a schematic illustration of the invention according to a preferred embodiment.

In carrying the invention into effect accordnig to the preferred embodiment, by way of example only, referring to FIGURE 1, we provide a "bootstrap" unit 1 comprising a turbine 2 and compressor 3 mechanically connected. Interposed in the circuit immediately upstream of the turbine 2 is a fuel/air cooler 4. Downstream of the turbine 2 a water separataor 5 is incorporated within the conduit 6 to the aircraft cabin 7 and equipment bay 8. We provide a turbo-driven compressor unit 10 comprising an auxiliary turbine 11 mechanically connected to compressor 12. Bleed air from an engine compressor, or the like (not shown), is communicated with the auxiliary turbine 11 by way of conduit 13 into which is interposed a throttle valve 14 and regenerative cooler 15. After expansion across the auxiliary turbine 11 the bleed air passes through an inter-cooler 16, conduit 17 and regenerative cooler 15 from whence it is vented to atmosphere. The requisite amount of make-up air is taken from conduit 13 through conduit 18 into conduit 19 disposed between the equipment bay 8 and "bootstrap compressor 3. Another conduit 20, incorporating a flow control valve 21, communicates between the bleed air in conduit 13 and the conditioned air in conduit 6.

Figure 2:
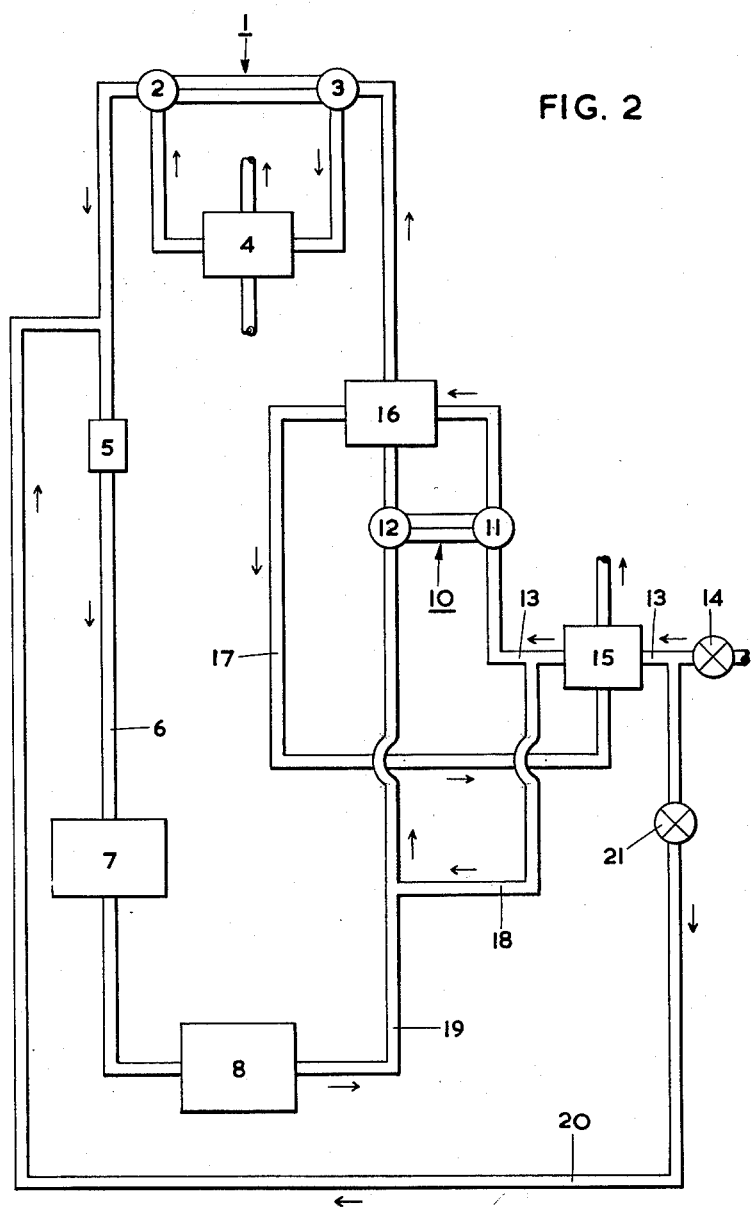
FIGURE 2 shows a schematic illustration of the invention according to a modified embodiment.

In carrying the invention into effect according to a modified embodiment, referring to FIGURE 2, we provide a system comprising the same basic components and circuit arrangement as hereinbefore described with reference to FIGURE 1, the only modification being that the air returning from the aircraft cabin and equipment bays by way of conduit 19 passes first through the turbo-driven compressor 12 and then the "boostrap" compressor 3. As for the preferred embodiment inter-cooler 16 is interposed between the two compression stages.

Figure 3:
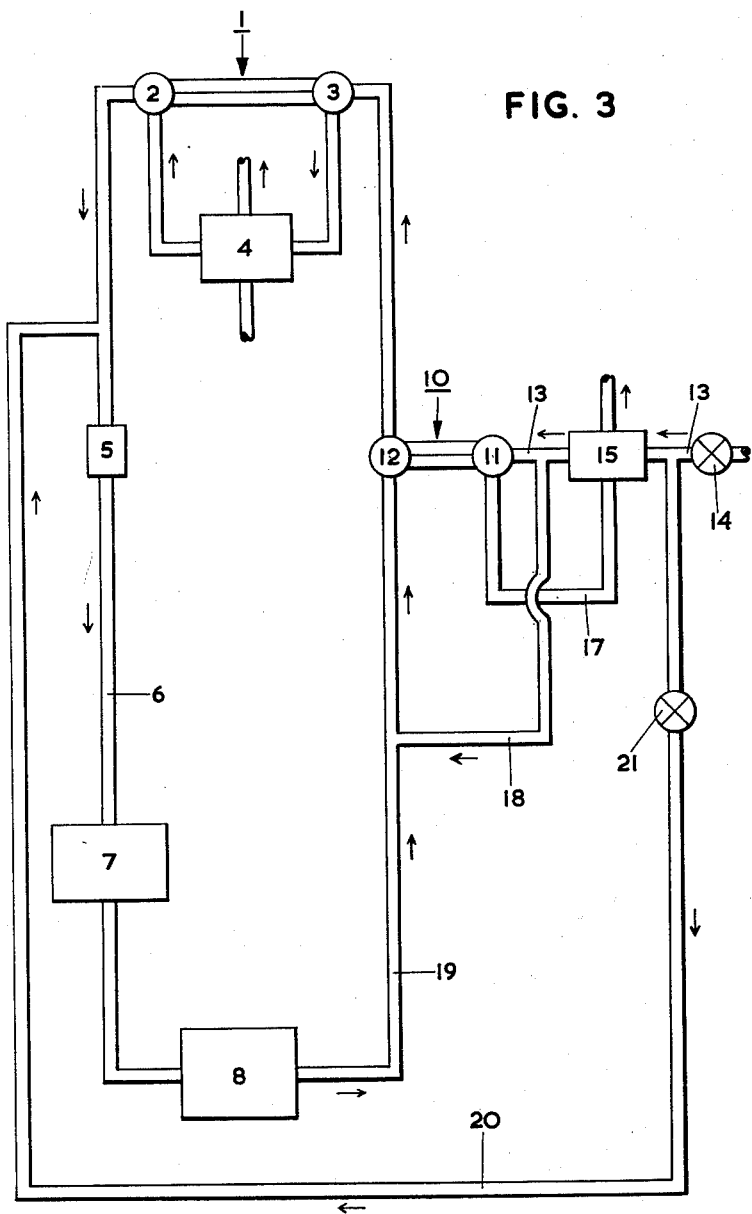
FIGURE 3 shows a schematic illustration of this invention according to a further modified embodiment.

In carrying the invention into effect according to a further modified embodiment, referring to FIGURE 3, we provide a system substantially as hereinbefore described with reference to FIGURE 1 and FIGURE 2 but without an intercooler disposed between the two compressors 12 and 3. Thus, the bleed air after expansion across the auxiliary turbine 11 passes direct through conduit 17 into the regenerative cooler 15 after which it is vented to atmosphere.

In operation of the invention, the circulating air is compressed in two stages to a condition at which heat may conveniently be extracted from it by way of the fuel/air cooler 4. The two stages comprise the turbo-driven compressor 12 and the "bootstrap" compressor 3, the order in which the air passes through said compressors 12 and 3 is dependent on the embodiment as hereinbefore described.

After passing through the two compression stages the circulating air is cooled in the fuel/air cooler 4 by the aircraft fuel as it passes from the fuel tanks to the engines. The air then expands across the "bootstrap" turbine 2 to a pressure and temperature suitable for circulation around the aircraft and in doing so develops sufficient power to drive the "bootstrap" compressor 3. The cooled air then passes through water separator 5 and conduit 6 into the aircraft cabin 7 and equipment bays 8 whence it returns to the compression stages by way of conduit 19. Any make-up air necessary to maintain pressure is taken from the engine bleed air in conduit 13 through conduit 18 and added to the circulating air in conduit 19 downstream of the compression stages.

The auxiliary turbine 11 is mechanically coupled to the auxiliary compressor 12 being powered by the expansion of bleed air across the turbine. The bleed air is taken from tappings on the engine. After expansion, said bleed air passes either to the regenerative cooler 15 direct or by way of the inter-cooler 16 and then into said regenative cooler 15, depending on the embodiment used. The function of the expanded bleed air in passing through said inter-cooler 16 is to act as a coolant for the circulating air between the two compression stages. Similarly, the expanded bleed air acts as a coolant in the regenerative cooler 15, for the engine bleed air before it enters the auxiliary turbine 11. Finally, after passing through the regenerative cooler 15 the bleed air is vented to atmosphere.

For completeness of the embodiments means have been shown for varying the cooling effect of the system to suit varying requirements of the aircraft cabin and equipment bays, but it will be appreciated and understood by those skilled in the art that there are numerous means for achieving the variation, each with its own particular merits in any particular installation. With the embodiments shown (FIGURES 1, 2 and 3), initial reduction in the cooling effect of the system is achieved by throttling the air supply to the auxiliary turbine thus reducing the speed and compression ratio of the auxiliary compressor. If the cooling effect is to be reduced still further, engine bleed air is passed through flow control valve 21 and conduit 20 into the closed circuit upstream of the water separator 5.

We claim as our invention:

1. In an aircraft, an air conditioning apparatus for an enclosure thereof, comprising the combination of a substantially closed circuit air cooling system, for the passage of air to and from said enclosure, an auxiliary air circulating system adapted to cool the air in said air cooling system, air augmenting means adapted to supply replenishment air, means for controlling the temperature therein and means for removing excess water, said air cooling system being characterised by a "bootstrap" unit, in conduit communication with said enclosure, operated in combination with a compressor, said compressor being driven by a turbine of said auxiliary air circulating system, said turbine being mechanically coupled to said compressor, and said compressor being in conduit communication with the compressor stage of said "bootstrap" unit by way of intercooler means in which the air of said auxiliary air circulating system is passed into heat exchange relationship with the air of the substantially closed circuit air cooling system.

2. In an aircraft, an air conditioning apparatus for an enclosure thereof as claimed in claim 1, wherein said cooling system comprises means for compressing the circulating air, cooling it and then causing it to expand across the "bootstrap" turbine to a lower pressure and temperature.

3. In an aircraft, an air conditioning apparatus for an enclosure thereof, comprising the combination of a substantially closed circuit air cooling system for the passage of air to and from said enclosure, said air cooling system comprising means for compressing the circulating air, cooling it and then causing it to expand across a turbine of a "bootstrap" unit to a lower pressure and temperature, an auxiliary air circulating system adapted to cool the air in said air cooling system, air augmenting means adapted to supply replenishment air, means for controlling the temperature therein and means for removing excess water, said air cooling system being characterised by said "bootstrap" unit operated in combination with a compressor driven by a turbine of said auxiliary air circulating system in a manner that air is compressed by first and second stages, said first stage being the turbo-driven compressor and said second stage being a compressor of the said "bootstrap" unit.

4. In an aircraft, an air conditioning apparatus for an enclosure thereof, comprising the combination of a substantially closed circuit air cooling system for the passage of air to and from said enclosure, an auxiliary air circulating system adapted to cool the air in said air cooling system, air augmenting means adapted to supply replenishment air, means for controlling the temperature therein and means for removing excess water, said air cooling system being characterised by a "bootstrap" unit operated in combination with a compressor driven by a turbine of said auxiliary air circulating system in a manner that air is compressed by first and second stages, said first stage being the turbo-driven compressor and said second stage being said "bootstrap" compressor, said auxiliary air circulating system comprising means for bleeding air from a compressor of an engine, or the like, at a suitable condition, causing it to expand across said turbine, thus developing sufficient power to drive said turbo-driven compressor to which it is mechanically connected, said air being vented to atmosphere after circulating throughout the system.

5. In an aircraft, an air conditioning apparatus for an enclosure as claimed in claim 4 wherein said auxiliary air circulating system has a regenerative cooler interposed between the source of said bleed air and said turbine, the coolant for said regenerative cooler being said bleed air before it is vented to atmosphere.

6. In an aircraft, an air conditioning apparatus for an enclosure thereof, comprising the combination of a substantially closed circuit air cooling system, for the passage of air to and from said enclosure, an auxiliary air circulating system adapted to cool the air in said air cooling system, air augmenting means adapted to supply replenishment air, means for controlling the temperature therein and means for removing excess water, said air cooling system being characterised by a "bootstrap" unit, in conduit communication with said enclosure, operated in combination with a compressor, said compressor being driven by a turbine of said auxiliary air circulating system, said turbine being mechanically coupled to said compressor, and said compressor being in conduit communication with the compressor stage of said "bootstrap" unit by way of intercooler means, in which the air of said auxiliary air circulating system is passed into heat exchange relationship with the air of the substantially closed circuit air cooling system, the cooling means of said "bootstrap" unit, between the compression stages and the "bootstrap" turbine, comprises a fuel/air cooler in which the aircraft fuel in passing from the fuel tanks to the engines acts as the coolant.

7. In an aircraft, an air conditioning apparatus for an enclosure thereof, comprising the combination of a substantially closed circuit air cooling system, for the passage of air to and from said enclosure, an auxiliary air circulating system adapted to cool the air in said air cooling system, air augmenting means adapted to supply replenishment air comprising suitable ducting and valves from the auxiliary air circulating system, downstream of said regenerative cooler, to the closed circuit system upstream of the compression stages, means for controlling the temperature therein and means for removing excess water, said air cooling system being characterised by a "bootstrap" unit, in conduit communication with said enclosure, operated in combination with a compressor, said compressor being driven by a turbine of said auxiliary air circulating system, said turbine being mechanically coupled to said compressor, and said compressor being in conduit communication with the compressor stage of said "bootstrap" unit by way of intercooler means in which the air of said auxiliary air circulating system is passed into heat exchange relationship with the air of the substantially closed circuit air cooling system.

8. In an aircraft, an air conditioning apparatus for an enclosure thereof, comprising the combination of a substantially closed circuit air cooling system, for the passage of air to and from said enclosure, an auxiliary air circulating system adapted to cool the air in said air cooling system, air augmenting means adapted to supply replenishment air, means for controlling the temperature therein comprising a throttle valve between the bleed air source and the turbine, suitable ducting and valves from said auxiliary air circulating system of the regenerative cooler, to the closed circuit air upstream of said enclosure and means for by-passing portions of the enclosure if desired, and means for removing excess water, said air cooling system being characterised by a "bootstrap" unit, in conduit communication with said enclosure, operated in combination with a compressor, said compressor being driven by a turbine of said auxiliary air circulating system, said turbine being mechanically coupled to said compressor, and said compressor being in conduit communication with the compressor stage of said "bootstrap" unit by way of intercooler means in which the air of said auxiliary air circulating system is passed into heat exchange relationship with the air of the substantially closed circuit air cooling system.

9. In the aircraft, an air conditioning apparatus as claimed in claim 3, wherein the substantially closed circuit air to be conditioned is first compressed by the "bootstrap" compressor and secondly by the turbo-driven compressor.

10. In an aircraft, an air conditioning apparatus for an enclosure thereof, wherein said enclosure comprises an aircraft cabin and, or equipment bays, said air conditioning apparatus comprising the combination of a substantially closed circuit air cooling system, for the passage of air to and from said enclosure, an auxiliary air circulating system adapted to cool the air in said air cooling system, air augmenting means adapted to supply replenishment air, means for controlling the temperature therein and means for removing excess water, said air cooling system being characterised by a "bootstrap" unit, in conduit communication with said enclosure, operated in combination with a compressor, said compressor being driven by a turbine of said auxiliary air circulating system, said turbine being mechanically coupled to said compressor and said compressor being in conduit communication with the compressor stage of said "bootstrap" unit by way of intercooler means in which the air of said auxiliary air circulating system is passed into heat exchange relationship with the air of the substantially closed circuit air cooling system.

References Cited in the file of this patent

UNITED STATES PATENTS

| | | |
|---|---|---|
| 2,800,002 | Seed | July 23, 1957 |
| 2,856,758 | Eggleston | Oct. 21, 1958 |